(12) United States Patent
Ozawa et al.

(10) Patent No.: US 12,744,224 B2
(45) Date of Patent: Sep. 22, 2026

(54) ELECTRODE CATALYST LAYER, MEMBRANE ELECTRODE ASSEMBLY, AND POLYMER ELECTROLYTE FUEL CELL

(71) Applicant: TOPPAN INC., Tokyo (JP)

(72) Inventors: Madoka Ozawa, Tokyo (JP); Atsuhiro Kawamura, Kitakatsushika-gun (JP)

(73) Assignee: TOPPAN INC., Tokyo (JP)

( * ) Notice: Subject to any disclaimer, the term of this patent is extended or adjusted under 35 U.S.C. 154(b) by 651 days.

(21) Appl. No.: 18/207,536

(22) Filed: Jun. 8, 2023

(65) Prior Publication Data

US 2023/0317968 A1 Oct. 5, 2023

Related U.S. Application Data

(63) Continuation of application No. PCT/JP2021/045647, filed on Dec. 10, 2021.

(30) Foreign Application Priority Data

Dec. 10, 2020 (JP) ................................ 2020-205355
May 31, 2021 (JP) ................................ 2021-091257

(51) Int. Cl.
*H01M 4/90* (2006.01)
*H01M 8/1004* (2016.01)
*H01M 8/1039* (2016.01)
*H01M 8/10* (2016.01)

(52) U.S. Cl.
CPC ....... *H01M 4/9083* (2013.01); *H01M 8/1004* (2013.01); *H01M 8/1039* (2013.01); *H01M 2008/1095* (2013.01)

(58) Field of Classification Search
CPC ............. H01M 4/0983; H01M 8/1004; H01M 8/1039; H01M 2008/1095
See application file for complete search history.

(56) References Cited

U.S. PATENT DOCUMENTS

2023/0275239 A1 8/2023 Chinone et al.

FOREIGN PATENT DOCUMENTS

| | | | |
|---|---|---|---|
| CN | 101000967 | A | 7/2007 |
| EP | 4 216 321 | A1 | 7/2023 |
| JP | 2003-123769 | A | 4/2003 |
| JP | 3617237 | B2 | 2/2005 |

(Continued)

OTHER PUBLICATIONS

JP2003123769 translation (Year: 2003).*

(Continued)

*Primary Examiner* — Jane J Rhee
(74) *Attorney, Agent, or Firm* — Foley & Lardner LLP

(57) ABSTRACT

An electrode catalyst layer, a membrane electrode assembly, and a polymer electrolyte fuel cell, which are capable of improving material transport properties and proton conductivity in the electrode catalyst layer, and which are capable of exhibiting high power generation performance over the long term and have good durability. The electrode catalyst layer for use in a polymer electrolyte fuel cell, and includes: a catalyst material; a conductive carrier that supports the catalyst material; a polymer electrolyte; and a fibrous material, wherein the fibrous material contains a material having nitrogen atoms, and the content of the fibrous material in the electrode catalyst layer is 1 wt % or more and less than 12 wt %.

7 Claims, 4 Drawing Sheets

(56) References Cited

FOREIGN PATENT DOCUMENTS

| | | | |
|---|---|---|---|
| JP | 5537178 | B2 | 7/2014 |
| WO | WO-2019/151310 | A1 | 8/2019 |
| WO | WO-2019/189891 | A1 | 10/2019 |

OTHER PUBLICATIONS

WO2019151310 translation (Year: 2019).*

European Extended Search Report issued in corresponding European Patent Application No. 21903503.7 dated Jun. 2, 2025.

International Searching Authority, "International Search Report," issued in connection with International Patent Application No. PCT/JP2021/045647, dated Mar. 1, 2022.

International Searching Authority, "Written Opinion," issued in connection with International Patent Application No. PCT/JP2021/045647, dated Mar. 1, 2022.

* cited by examiner

ELECTRODE CATALYST LAYER, MEMBRANE ELECTRODE ASSEMBLY, AND POLYMER ELECTROLYTE FUEL CELL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/045647, filed on Dec. 10, 2021, which in turn claims the benefit of JP 2020-205355, filed Dec. 10, 2020 and of JP 2021-091257, filed May 31, 2021, the disclosures of all which are incorporated herein by reference in its entirety.

TECHNICAL FIELD

The present invention relates to an electrode catalyst layer, a membrane electrode assembly, and a polymer electrolyte fuel cell.

BACKGROUND

Fuel cells are power generation systems that produce electricity through a chemical reaction between hydrogen and oxygen. Fuel cells have features such as high efficiency, low environmental load and low noise compared to conventional power generation systems, and are receiving attention as a future clean energy source. In particular, polymer electrolyte fuel cells usable at around room temperature are regarded as promising for use as in-vehicle power sources and stationary power sources for domestic use, and various research and development regarding polymer electrolyte fuel cells has been carried out in recent years. The problems facing practical use include a need to improve cell performance such as the power generation characteristics and durability, construction of infrastructure, and reduction of production costs.

Generally, polymer electrolyte fuel cells are formed by stacking a large number of single cells. A single cell has a structure in which a membrane electrode assembly, which has a fuel electrode (anode) that supplies a fuel gas and an oxygen electrode (cathode) that supplies an oxidizing agent adhered to the two sides of a polymer electrolyte membrane, is sandwiched between separators having a gas flow path and a cooling water flow path. The fuel electrode (anode) and the oxygen electrode (cathode) are mainly constituted by an electrode catalyst layer and a gas diffusion layer. The electrode catalyst layer includes at least a catalyst material such as a platinum group noble metal, a conductive carrier, and a polymer electrolyte. The gas diffusion layer has both gas permeability and conductivity.

Polymer electrolyte fuel cells produce electricity through the following electrochemical reactions. First, in a fuel electrode side electrode catalyst layer, the hydrogen contained in the fuel gas is oxidized by the catalyst material to generate protons and electrons. The generated protons pass through the polymer electrolyte in the electrode catalyst layer and the polymer electrolyte membrane that is in contact with the electrode catalyst layer, and reach the oxygen electrode side electrode catalyst layer. Furthermore, the electrons generated at the same time pass through the conductive carrier in the fuel electrode side electrode catalyst layer, the gas diffusion layer that is in contact with the fuel electrode side electrode catalyst layer, a separator, and an external circuit, and then reach the oxygen electrode side electrode catalyst layer. Then, in the oxygen electrode side electrode catalyst layer, the protons and the electrons react with oxygen contained in an oxidant gas such as air to generate water. In this series of reactions, because the proton-conductive resistance is greater than the electron-conductive resistance, it is important for the proton conduction to be efficient to improve the reactivity and improve the performance as a fuel cell.

The gas diffusion layer has the role of diffusing the gas supplied from the separator and supplying the gas into the electrode catalyst layer. Further, pores in the electrode catalyst layer are located further ahead of the separator and the gas diffusion layer, and serve as passages that transport a plurality of substances. The pores of the fuel electrode are required to have the function of smoothly supplying the hydrogen contained in the fuel gas to a three-phase interface, which is a redox reaction field. Moreover, the pores of the oxygen electrode are required to have the function of smoothly supplying the oxygen contained in the oxidant gas. In addition, the pores of the oxygen electrode are required to have the function of smoothly discharging water generated by the reaction. Here, in order to smoothly supply the gas and smoothly discharge the generated water, it is important that there are sufficient voids in the electrode catalyst layer that allow the generated water to be smoothly discharged, and that the structure is not dense.

As a means of controlling the structure of the electrode catalyst layer so as to not become dense, and improving the power generation performance, for example, an electrode catalyst layer has been proposed that contains carbon or carbon fibers with different particle diameters (PTLs 1 and 2).

In PTL 1, by combining carbon particles having appropriately different particle sizes, the electrode catalyst layer is prevented from becoming densely packed with carbon particles. When large particles with a large particle size and small particles with a small particle size are mixed, the small particles may enter the voids between large particles, resulting in even denser packing. Furthermore, when the carbon material only contains particles, cracks in the catalyst layer are likely to be induced, resulting in a decrease in durability, which may be a problem.

In PTL 2, carbon fibers having different fiber lengths to each other are included, and by setting the ratio of the fiber lengths to a certain range, appropriate pores occupy a large proportion in the electrode catalyst layer. When carbon fibers are used, although dense packing can be prevented, the proton transfer resistance increases because the proportion of the electron conductor in the catalyst layer increases and the proportion of the proton conductor decreases, resulting in a decrease in the power generation performance.

The power generation performance of a fuel cell varies greatly depending on the material transport properties, electronic conductivity, and proton conductivity. Therefore, there is a limit to how much the power generation performance can be increased by a method that improves only the electronic conductivity using a combination of carbon particles or a combination of carbon fibers.

CITATION LIST

Patent Literature

PTL 1: JP 3617237 B; PTL 2: JP 5537178 B.

SUMMARY OF THE INVENTION

Technical Problem

The present invention has been made with a focus on the above points, and an object of the present invention is to provide an electrode catalyst layer, a membrane electrode assembly, and a polymer electrolyte fuel cell, which are capable of improving material transport properties and proton conductivity in the electrode catalyst layer, and which are capable of exhibiting high power generation performance over the long term and have good durability.

Solution to Problem

In order to solve the problem described above, an electrode catalyst layer according to an aspect of the present invention is an electrode catalyst layer for use in a polymer electrolyte fuel cell, including: a catalyst material; a conductive carrier that supports the catalyst material; a polymer electrolyte; and a fibrous material; wherein the fibrous material contains a material having a nitrogen atom, and a content of the fibrous material in the electrode catalyst layer is 1 wt % or more and less than 12 wt %.

Furthermore, an electrode catalyst layer according to another aspect of the present invention is an electrode catalyst layer for use in a polymer electrolyte fuel cell, including: a catalyst material; a conductive carrier that supports the catalyst material; a polymer electrolyte; and a fibrous material; wherein the fibrous material contains a Lewis base having an unshared electron pair, and a content of the fibrous material in the electrode catalyst layer is 1 wt % or more and less than 12 wt %.

Moreover, a membrane electrode assembly according to yet another aspect of the present invention includes an electrode catalyst layer according to an aspect of the present invention described above provided on at least one surface of a polymer electrolyte membrane.

In addition, a polymer electrolyte fuel cell according to yet another aspect of the present invention includes the membrane electrode assembly according to the aspect of the present invention described above.

Advantageous Effects of the Invention

According to an aspect of the present invention, it is possible to provide an electrode catalyst layer, a membrane electrode assembly, and a polymer electrolyte fuel cell, which are capable of improving material transport properties and proton conductivity in the electrode catalyst layer, and which are capable of exhibiting high power generation performance over the long term and have good durability.

BRIEF DESCRIPTION OF THE DRAWINGS

FIG. 2 is an exploded perspective view schematically showing the configuration of a polymer electrolyte fuel cell according to the first embodiment of the present invention.

DETAILED DESCRIPTION

Figure 1:
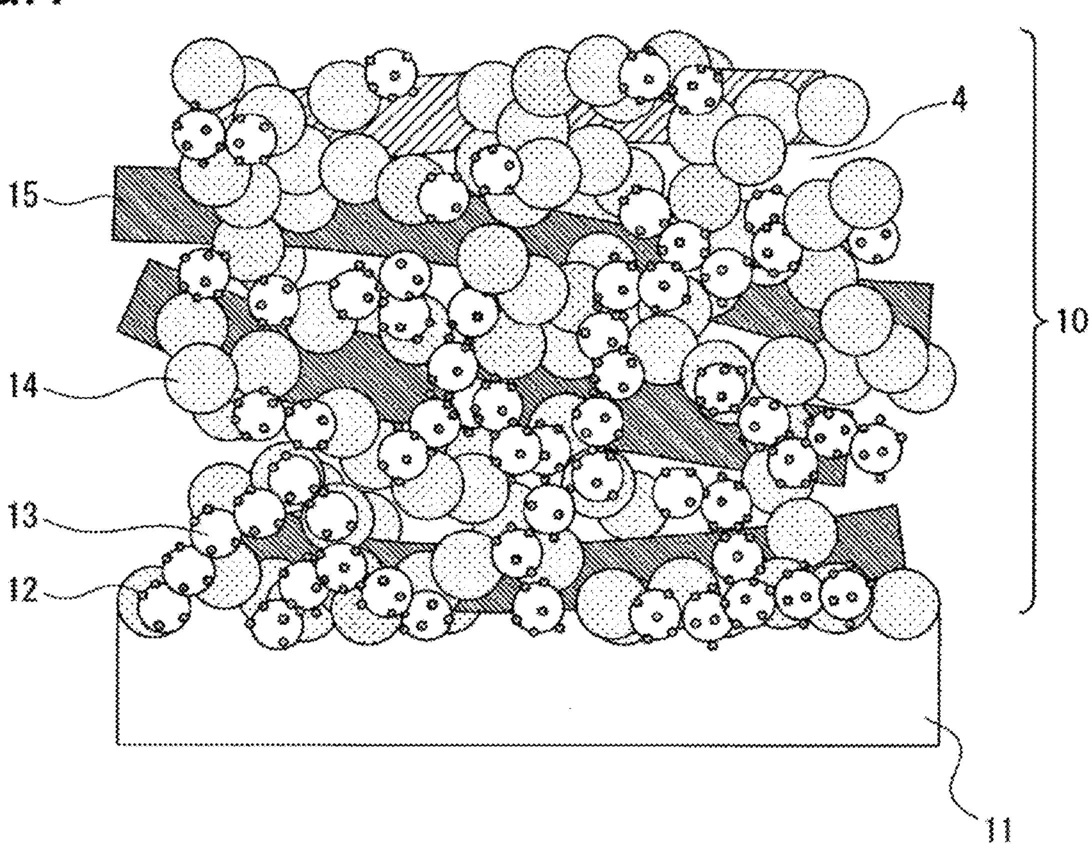
FIG. 1 is a cross-sectional view schematically showing an example of a cross-sectional structure of an electrode catalyst layer according to a first embodiment of the present invention.

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings. Positional relationships such as vertical and horizontal directions are based on the positional relationship illustrated in the drawings unless otherwise specified.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

1. First Embodiment

As a result of intensive studies on the initial power generation performance and the durable power generation performance of polymer electrolyte fuel cells, the inventors of the present invention have found that the performance is significantly affected by the gas diffusion properties and the proton conductivity in the electrode catalyst layer. Further, by using a fibrous material having nitrogen atoms in the electrode catalyst layer to form large voids, thereby improving the gas diffusion properties and lowering the proton-conductive resistance, the inventors have succeeded in obtaining a polymer electrolyte fuel cell that suppresses a decrease in battery output and deterioration of the electrode catalyst layer, and that exhibits high power generation performance over the long term and have excellent durability.

(Configuration of Electrode Catalyst Layer)

Hereinafter, an electrode catalyst layer according to a first embodiment of the present invention (referred to as "present embodiment" below) will be described with reference to FIG. 1. FIG. 1 is a cross-sectional view schematically showing an example of a cross-sectional structure of an electrode catalyst layer according to the present embodiment.

The electrode catalyst layer 10 according to the present embodiment is adhered to the surface of a polymer electrolyte membrane 11, and includes a catalyst material 12, a conductive carrier 13 that supports the catalyst material 12, a polymer electrolyte 14, and a fibrous material 15. Further, voids 4 are formed in portions where none of the above components are present.

The fibrous material 15 included in the electrode catalyst layer 10 according to the present embodiment contains a material having nitrogen atoms, and is formed of one or more types of fibrous materials.

Furthermore, the content of the fibrous material 15 in the electrode catalyst layer 10 may be in the range of 0.5 wt % or more and 15 wt % or less, and more preferably in the range of 1.0 wt % or more and less than 12 wt %. When the content of the fibrous material 15 having nitrogen atoms in the electrode catalyst layer 10 is within this range, it is possible to generate interactions between the unshared electron pairs on the nitrogen atoms and the protons of the polymer electrolyte. Consequently, the proton conductivity in the electrode catalyst layer 10 is improved, and the output characteristics can be improved. When the content of the fibrous material 15 in the electrode catalyst layer 10 is 12 wt % or more, the power generation performance tends to decrease.

The weight ratio of the fibrous material 15 included in the electrode catalyst layer 10 can be obtained from a ratio between the weight after removal of included materials other than the relevant material by a chemical procedure or an electrochemical procedure, and the weight before the removal procedure. For example, the catalyst material can be dissolved by an acid such as aqua regia that contains a strong oxidizing agent, and the conductive carrier can be burned out by applying a high potential. Furthermore, polymer electrolytes and polymer electrolyte membranes can be decomposed by hydrogen peroxide or the like.

When the content of the fibrous material 15 having nitrogen atoms in the electrode catalyst layer 10 is lower than the above range, for example, interactions with the sulfonic acid groups in the polymer electrolyte 14 are weakened, which can result in insufficient proton conduction paths and cause an increase in resistance. Furthermore, when the content of the fibrous material 15 having nitrogen atoms in the electrode catalyst layer 10 is greater than the above range, entanglement or aggregation of the fibers with each other blocks the voids, which can prevent sufficient drainage and gas diffusion properties from being ensured.

Although an example in which the fibrous material 15 contains nitrogen atoms has been described, the present invention is not limited to this. The fibrous material 15 may contain a Lewis base having an unshared electron pair. This allows the polymer electrolyte to interact with the protons.

More specifically, the Lewis base (a Lewis base having an unshared electron pair) contained in the fibrous material 15 may preferably be a soft Lewis base or an intermediate Lewis base in terms of the HSAB principle from the viewpoint of compatibility with the polymer electrolyte 14. A hard Lewis base (for example, a carbonyl group) in terms of the HSAB principle strongly interacts with the sulfonic acid groups in the polymer electrolyte 14, which increases the viscosity and cause gelation of the ink, and can make coating difficult.

Examples of fibrous materials having nitrogen atoms that satisfy the condition of being a Lewis base having an unshared electrone pair include polybenzimidazole and polybenzoxazole, which are types of polybenzoazoles. Furthermore, as the fibrous material 15, an aromatic polymer material having phosphine groups or phosphine oxide groups can also be used as a fibrous material that does not contain nitrogen atoms.

The average fiber diameter of the fibrous material 15 included in the electrode catalyst layer 10 according to the present embodiment may preferably be 50 nm or more and 400 nm or less. By setting the fiber diameter in this range, the voids 4 in the electrode catalyst layer 10 can be increased, and a decrease in the proton conductivity can be suppressed, thereby enabling higher output. When the average fiber diameter of the fibrous material 15 is less than the above range, the fibrous material may block the voids, thereby failing to ensure sufficient drainage and gas diffusion. Furthermore, when the average fiber diameter of the fibrous material 15 is larger than the above range, the conduction of electrons and protons by the conductive carrier 13 and the polymer electrolyte 14 may be inhibited, which may increase resistance.

In addition, the fiber length of the fibrous material 15 may preferably be 1 μm or more to 100 μm or less, and more preferably be 5 μm or more to 50 μm or less. By setting the fiber length in a range of 1 μm or more and 100 μm or less, the strength of the electrode catalyst layer 10 can be increased, which in turn suppresses the occurrence of cracks in the electrode catalyst layer 10 when the electrode catalyst layer 10 is formed.

The fiber diameter of the fibrous material 15 is obtained by measuring, for example, the diameter of the fibrous material 15 that is exposed in the cross-section when a cross-section of the electrode catalyst layer 10 is observed using a scanning electron microscope (SEM). When the fibrous material 15 is cut diagonally, the shape of the exposed cross-section may be an oval shape. In this case, the fiber diameter of the fibrous material 15 can be obtained by measuring the diameter of a perfect circle fitted along the minor axis. The average fiber diameter can be obtained by measuring the fiber diameter of the fibrous material 15 at a plurality of locations, such as 20 locations, and then calculating the arithmetic mean.

The method of exposing the cross-section of the electrode catalyst layer 10 includes, for example, known methods such as ion milling and ultramicrotomy. When performing processing to expose the cross-section, in order to reduce the damage to the polymer electrolyte membrane 11 and the polymer electrolyte 14 that constitutes the electrode catalyst layer 10, it is particularly preferable to use cryo-ion milling which performs the processing while cooling the electrode catalyst layer 10.

The thickness of the electrode catalyst layer 10 may preferably be 5 μm or more and 30 μm or less. If the thickness is more than 30 μm, cracks are likely to occur, and the diffusion properties and conductivity of the gas and water produced when used in fuel cells may decrease, resulting in a decrease in output. Furthermore, when the thickness is less than 5 μm, the layer thickness tends to vary, and the catalyst material 12 and the polymer electrolyte 14 inside tend to be non-uniform. Cracking on the surface of the electrode catalyst layer 10 and non-uniformity in the thickness can lead to a high probability of the durability being adversely affected when used as a fuel cell and operated for a long period of time, which is not preferable.

The thickness of the electrode catalyst layer 10 can be measured by, for example, observing the cross-section of the catalyst layer 10 using a scanning electron microscope (SEM). The method of exposing the cross-section of the electrode catalyst layer 10 includes, for example, known methods such as ion milling and ultramicrotomy. When performing processing to expose the cross-section, in order to reduce the damage to the polymer electrolyte membrane 11 and the polymer electrolyte 14 that constitutes the electrode catalyst layer 10, it is particularly preferable to use cryo-ion milling which performs the processing while cooling the electrode catalyst layer 10.

Examples of the catalyst material 12 include metals included in the platinum group, metals other than those in the platinum group, and alloys, oxides, composite oxides, and carbides of these metals. The metals included in the platinum group are platinum, palladium, ruthenium, iridium, rhodium, and osmium. Examples of metals other than the platinum group metals include iron, lead, copper, chromium, cobalt, nickel, manganese, vanadium, molybdenum, gallium, and aluminum.

As the conductive carrier 13, it is possible to use a carrier that has electrical conductivity and can support the catalyst material 12 without being corroded by the catalyst material 12. It is possible to use carbon particles as the conductive carrier 13. Examples of the carbon particles include carbon black, graphite, black lead, activated carbon, carbon nanotubes, carbon nanofibers, and fullerenes. The carbon particles may preferably have a particle size of about 10 nm or more and 1000 nm or less, and more preferably have a particle size of about 10 nm or more and 100 nm or less. Because the particle size is 10 nm or more, the carbon particles are not too densely packed in the electrode catalyst layer 10, which suppresses the reduction in the gas diffusion properties of the electrode catalyst layer 10. Because the particle size is 1000 nm or less, the occurrence of cracks in the electrode catalyst layer 10 is suppressed. The particle size of the carbon particles is the volume average diameter determined by laser diffraction/scattering.

An electrolyte having proton conductivity can be used for the polymer electrolyte membrane 11 and the polymer electrolyte 14 contained in the electrode catalyst layer 10. For the polymer electrolyte, for example, a fluorinated polyelectrolyte and a hydrocarbon polyelectrolyte can be used. A polymer electrolyte having a tetrafluoroethylene skeleton can be used as the fluorinated polyelectrolyte. Note that Nafion (registered trademark) manufactured by DuPont can be exemplified as a polymer electrolyte having a tetrafluoroethylene skeleton. Examples of the hydrocarbon polymer electrolyte include sulfonated polyether ketones, sulfonated polyether sulfones, sulfonated polyether ether sulfones, sulfonated polysulfides, and sulfonated polyphenylenes.

The polymer electrolyte contained in the polymer electrolyte membrane 11 and the polymer electrolyte 14 contained in the electrode catalyst layer 10 may be the same electrolyte, or different electrolytes to each other. However, in consideration of the interfacial resistance at the interface between the polymer electrolyte membrane 11 and the electrode catalyst layer 10, and the dimensional change ratio between the polymer electrolyte membrane 11 and the electrode catalyst layer 10 in the case of a change in humidity, it is preferable that the polymer electrolyte contained in the polymer electrolyte membrane 11, and the polymer electrolyte 14 contained in the electrode catalyst layer 10 are the same electrolyte, or are polymer electrolytes with similar thermal expansion coefficients.

(Configuration of Membrane Electrode Assembly)

Figure 2:
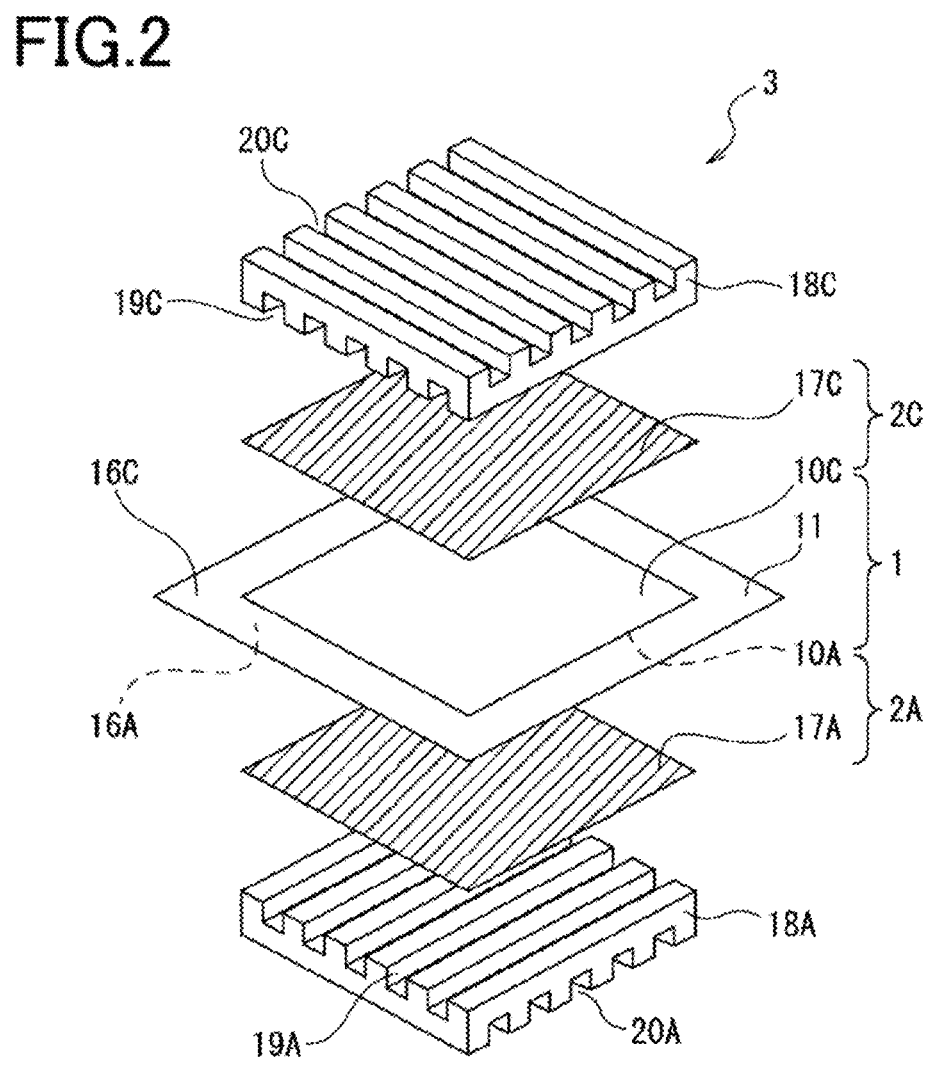

Next, the configuration of the membrane electrode assembly will be described with reference to FIG. 2. FIG. 2 is an exploded perspective view schematically showing the configuration of a polymer electrolyte fuel cell 3 equipped with a membrane electrode assembly 1 provided with the electrode catalyst layer 10 according to the present embodiment.

The membrane electrode assembly 1 includes a polymer electrolyte membrane 11, and electrode catalyst layers 10C and 10A that are respectively adhered to the front and rear surfaces of the polymer electrolyte membrane 11. In the present embodiment, the electrode catalyst layer 10C formed on the upper surface (front surface) of the polymer electrolyte membrane 11 is a cathode side electrode catalyst layer constituting the oxygen electrode, and the electrode catalyst layer 10A formed on the lower surface (rear surface) of the polymer electrolyte membrane 11 is an anode side electrode catalyst layer constituting the fuel electrode. Hereinafter, the pair of electrode catalyst layers 10C and 10A may be abbreviated as "catalyst layers 10" when there is no need to distinguish the two layers. In the membrane electrode assembly 1 according to the present embodiment, the electrode catalyst layers 10 are provided on at least one surface of the polymer electrolyte membrane 11. Furthermore, an oxygen electrode side gasket 16C and a fuel electrode side gasket 16A are arranged in the membrane electrode assembly 1 to prevent gas leakage from the peripheral sections where the electrode catalyst layers 10 of the polymer electrolyte membrane 11 are not adhered.

(Method of Producing Membrane Electrode Assembly)

A method of producing the membrane electrode assembly 1 will be described below.

First, a catalyst ink is prepared. The catalyst material 12, the conductive carrier 13, the polymer electrolyte 14, and the fibrous material 15 are mixed with a dispersion medium, and then the catalyst ink is prepared by subjecting the mixture to a dispersion process. The dispersion process can be performed using, for example, a planetary ball mill, a bead mill, or an ultrasonic homogenizer.

As the dispersion medium of the catalyst ink, it is possible to use a solvent that does not corrode the catalyst material 12, the conductive carrier 13, the polymer electrolyte 14, and the fibrous material 15, and is capable of dissolving the polymer electrolyte 14 in a state where the fluidity of the dispersion medium is high, or is capable of dispersing the polymer electrolyte 14 as a fine gel. The dispersion medium may contain water. The catalyst ink preferably contains a volatile liquid organic solvent. Because there is a danger of ignition when the solvent is a lower alcohol, such a solvent is preferably mixed with water. Water can be mixed with the solvent to an extent in which the catalyst ink does not become turbid or undergo gelation due to separation of the polymer electrolyte 14.

The prepared catalyst ink is applied to a substrate and then dried, such that the solvent is removed from the coating film of the catalyst ink. As a result, the electrode catalyst layer 10 is formed on the substrate. The polymer electrolyte membrane 11 or a transfer substrate can be used as the substrate.

When the polymer electrolyte membrane 11 is used as the substrate, for example, it is possible to use a method in which the electrode catalyst layer 10 is formed by directly applying the catalyst ink to the surface of the polymer electrolyte membrane 11, and then removing the solvent from the coating film of the catalyst ink.

When a transfer substrate is used, a catalyst layer-attached substrate is prepared by applying catalyst ink to the transfer substrate and then drying the catalyst ink. Then, for example, by applying heat and pressure in a state where the surface of the electrode catalyst layer 10 of the catalyst layer-attached substrate and the polymer electrolyte membrane 11 are in contact with each other, the electrode catalyst layer 10 and the polymer electrolyte membrane 11 are adhered together. The membrane electrode assembly 1 can be produced by adhering the electrode catalyst layers 10 to both surfaces of the polymer electrolyte membrane 11.

Various coating methods can be used to apply the catalyst ink to the substrate. Examples of coating methods include die coating, roll coating, curtain coating, spray coating, and squeegeeing. It is preferable to use die coating as the coating method. Die coating is preferable in that the film thickness is stable in the middle of the coating period and intermittent coating is possible. As the method of drying the coating film of the catalyst ink, for example, drying using a hot air oven, IR (far infrared) drying, drying using a hot plate, and drying under reduced pressure can be used. The drying temperature is 40° C. or more and 200° C. or less, and is preferably approximately 40° C. or more and 120° C. or less. The drying time is 0.5 minutes or more and 1 hour or less, and is preferably about 1 minute or more and 30 minutes or less.

When the electrode catalyst layer 10 is formed on the transfer substrate, the pressure and temperature applied to the electrode catalyst layer 10 during transfer of the electrode catalyst layer 10 affect the power generation performance of the membrane electrode assembly 1. To obtain a membrane electrode assembly having high power generation performance, the pressure applied to the electrode catalyst layer 10 may preferably be 0.1 MPa or more and 20 MPa or less. When the pressure is 20 MPa or less, the electrode catalyst layer 10 is prevented from being excessively compressed. When the pressure is 0.1 MPa or more, decrease in the power generation performance due to reduction in the bonding properties between the electrode catalyst layer 10 and the polymer electrolyte membrane 11 is suppressed. In consideration of improving the bonding properties of the interface between the polymer electrolyte membrane 11 and the electrode catalyst layer 10, and suppressing interfacial resistance, the temperature during bonding is preferably at around the glass transition temperature of the polymer electrolyte membrane 11 or the polymer electrolyte 14 contained in the electrode catalyst layer 10.

As the transfer substrate, for example, a sheet body formed of a polymer film and a fluororesin can be used. Fluororesins have excellent transferability. Examples of fluororesins include ethylene tetrafluoroethylene copolymer (ETFE), tetrafluoroethylene-hexafluoropropylene copolymer (FEP), tetrafluoroperfluoroalkyl vinyl ether copolymer (PFA), and polytetrafluoroethylene (PTFE). Examples of the polymer forming the polymer film include polyimide, polyethylene terephthalate, polyamide (Nylon (registered trademark)), polysulfone, polyethersulfone, polyphenylene sulfide, polyether ether ketone, polyether imide, polyarylate, and polyethylene naphthalate. A gas diffusion layer can also be used as the transfer substrate.

Here, by adjusting the blending ratio of the fibrous material 15, the blending ratio of the polymer electrolyte 14, the solvent composition of the catalyst ink, the dispersion strength when adjusting the catalyst ink, and the heating temperature and heating rate of the coated catalyst ink, the electrode catalyst layer 10 can be provided with sufficient gas diffusion properties and proton conductivity.

For example, the blending ratio of the polymer electrolyte 14 in the electrode catalyst layer 10 is preferably from about the same to about half the weight of the conductive carrier 13. The blending ratio of the fibrous material 15 is preferably from about the same or less than the weight of the conductive carrier 13. The solid content ratio of the catalyst ink is preferably high to the extent that it can be applied to the thin film.

(Configuration of Polymer Electrolyte Fuel Cell)

A specific configuration example of the polymer electrolyte fuel cell 3 provided with the membrane electrode assembly 1 according to the present embodiment will be described with reference to FIG. 2. Note that FIG. 2 is a configuration example of a single cell, and the polymer electrolyte fuel cell 3 is not limited to this configuration and may have a configuration in which a plurality of single cells are stacked.

The polymer electrolyte fuel cell 3 includes the membrane electrode assembly 1, an oxygen electrode side gas diffusion layer 17C, and a fuel electrode side gas diffusion layer 17A. The gas diffusion layer 17C is arranged facing the electrode catalyst layer 10C, which is the cathode side electrode catalyst layer on the oxygen electrode side of the membrane electrode assembly 1. Furthermore, the gas diffusion layer 17A is arranged facing the electrode catalyst layer 10A, which is the anode side electrode catalyst layer on the fuel electrode side of the membrane electrode assembly 1. Moreover, the electrode catalyst layer 10C and the gas diffusion layer 17C constitute an oxygen electrode 2C, and the electrode catalyst layer 10A and the gas diffusion layer 17A constitute a fuel electrode 2A.

In addition, the polymer electrolyte fuel cell 3 includes a separator 18C, which is arranged facing the oxygen electrode 2C, and a separator 18A, which is arranged facing the fuel electrode 2A. The separator 18C includes gas flow channels 19C for passage of a reaction gas that are formed on the surface facing the gas diffusion layer 17C, and cooling water flow channels 20C for passing a coolant that are formed on the opposite surface to the surface in which the gas flow channels 19C are formed. Furthermore, the separator 18A has the same structure as the separator 18C, and includes gas flow channels 19A that are formed on the surface facing the gas diffusion layer 17A, and cooling water flow channels 20A that are formed on the opposite surface to the surface in which the gas flow channels 19A are formed. The separators 18C and 18A are made of a conductive and gas impermeable material.

Further, in the polymer electrolyte fuel cell 3, electrical power is generated by supplying an oxidizing agent such as air or oxygen to the oxygen electrode 2C through the gas flow channels 19C of the separator 18C, and supplying a fuel gas containing hydrogen or an organic fuel to the fuel electrode 2A through the gas flow channels 19A of the separator 18A.

By adopting the membrane electrode assembly 1 according to the present embodiment, the polymer electrolyte fuel cell 3 according to the present embodiment has sufficient drainage and gas diffusion properties, and is capable of exhibiting high power generation performance over the long term and has high durability.

That is, according to the present invention, it is possible to provide the electrode catalyst layer 10, the membrane electrode assembly 1, and the polymer electrolyte fuel cell 3 that have sufficient gas diffusion properties and proton conductivity during operation of the polymer electrolyte fuel cell 3, and are capable of exhibiting high power generation performance over the long term and have high durability. Therefore, the present invention is suitable for stationary cogeneration systems, fuel cell cars that utilize a polymer electrolyte fuel cell, and the like, and has a high industrial value.

First Example

Hereinafter, examples of the membrane electrode assembly based on the present embodiment will be described.

Example 1-1

In Example 1, a carbon-supported platinum catalyst (TEC10E50E, manufactured by Tanaka Kikinzoku Kogyo Co., Ltd.), water, 1-propanol, a polymer electrolyte (20% Nafion (registered trademark) dispersion, manufactured by Wako Pure Chemical Industries, Ltd.) and a fibrous material (diameter: 250 to 300 nm) having nitrogen atoms were mixed together. The mixture was dispersed using a planetary ball mill at 300 rpm for 60 minutes. At this time, zirconia balls with a diameter of 5 mm were added to a level of about one third of the zirconia container. The catalytic ink was prepared by adjusting the weight of the polymer electrolyte to be 100 wt % with respect to the weight of the carbon support in the carbon-supported platinum catalyst, the fibrous material having nitrogen atoms to be 10 wt % with respect to the weight of the carbon support in the carbon-supported platinum catalyst, the proportion of water in the dispersion medium to be 50 wt %, and the solid content concentration to be 10 wt %.

A coating film was formed by applying the catalyst ink to one surface of a polymer electrolyte membrane (Nafion (registered trademark) 211, manufactured by Dupont) using a slit die coater so as to have a thickness of 200 μm. Next, the polymer electrolyte membrane with the coating film formed thereon was dried in a hot air oven at 80° C. until the tackiness of the coating film disappeared to form a cathode side electrode catalyst layer. Then, a coating film was formed by applying the catalyst ink to the other surface of the polymer electrolyte membrane using a slit die coater so as to have a thickness of 50 μm. Next, the polymer electrolyte membrane with the coating film formed thereon was dried in a hot air oven at 80° C. until the tackiness of the coating film disappeared to form an anode side electrode catalyst layer. As a result, the membrane electrode assembly of Example 1-1 was obtained. The proportion of the fibrous material in the electrode catalyst layer was 3 wt %.

Example 1-2

The membrane electrode assembly of Example 1-2 was obtained in the same manner as in Example 1, except that the amount of the fibrous material having nitrogen atoms was doubled (20 wt % with respect to the weight of the carbon support) relative to Example 1 when preparing the catalyst ink. The proportion of the fibrous material in the electrode catalyst layer was 6 wt %.

Example 1-3

The membrane electrode assembly of Example 1-3 was obtained in the same manner as in Example 1, except that the amount of the fibrous material having nitrogen atoms was halved (5 wt % with respect to the weight of the carbon support) relative to Example 1 when preparing the catalyst ink. The proportion of the fibrous material in the electrode catalyst layer was 1 wt %.

Example 1-4

The catalyst ink was prepared using the same method as in Example 1. A coating film was formed by applying the catalyst ink to the surface of a PTFE film using a slit die coater so as to have a thickness of 200 μm. Next, the PTFE film with the coating film formed thereon was dried in a hot air oven at 80° C. until the tackiness of the coating film disappeared to obtain a cathode side electrode catalyst layer-attached transfer substrate. Then, a coating film was formed by applying the catalyst ink to the surface of another PTFE film using a slit die coater so as to have a thickness of 50 μm. Next, the PTFE film with the coating film formed thereon was dried in a hot air oven at 80° C. until the tackiness of the coating film disappeared to obtain an anode side electrode catalyst layer-attached transfer substrate.

A laminate was formed by arranging the cathode side electrode catalyst layer-attached transfer substrate and the anode side electrode catalyst layer-attached transfer substrate on the front and rear surfaces of the polymer electrolyte membrane (Nafion (registered trademark) 211, manufactured by Dupont) so as to face each other. Then, the laminate was hot-pressed at 120° C. and 1 MPa to adhere the electrode catalyst layers to the front and rear surfaces of the polymer electrolyte membrane. Finally, the membrane electrode assembly of Example 1-4 was obtained by releasing the PTFE film from each of the electrode catalyst layers. The proportion of the fibrous material in the electrode catalyst layer was 3 wt %.

Comparative Example 1-1

The membrane electrode assembly of Comparative Example 1-1 was obtained in the same manner as in Example 1, except that the fibrous material having nitrogen atoms was not added when preparing the catalyst ink. The proportion of the fibrous material in the electrode catalyst layer was 0 wt %.

Comparative Example 1-2

The membrane electrode assembly of Comparative Example 1-2 was obtained in the same manner as in Example 1-1, except that the amount of the fibrous material having nitrogen atoms was quadrupled (80 wt % with respect to the weight of the carbon support) relative to Example 1-1 when preparing the catalyst ink. The proportion of the fibrous material in the electrode catalyst layer was 12 wt %.

Comparative Example 1-3

The membrane electrode assembly of Comparative Example 1-3 was obtained in the same manner as in Example 1, except that carbon nanofibers not having nitrogen atoms (VGCF (registered trademark)-H, manufactured by Showa Denko K.K.) was used instead of the fibrous material having nitrogen atoms when preparing the catalyst ink. The proportion of the fibrous material having nitrogen atoms in the electrode catalyst layer was 0 wt %, and the proportion of the fibrous material not having nitrogen atoms was 3 wt %.

bility evaluation. In Table 1, the "fibrous material content in electrode catalyst layer" indicates the total content of the fibrous material in the electrode catalyst layer.

TABLE

| Example/ Example Comparative | Condition: Fibrous Material Content in Electrode Catalyst Layer [wt %] | Condition: Nitrogen-Containing Fibrous Material Content in Electrode Catalyst Layer [wt %] | Evaluation: Power Generation Performance | Evaluation: Durability |
|---|---|---|---|---|
| Example 1-1 | 3.0 | 3.0 | Good | Good |
| Example 1-2 | 6.0 | 6.0 | Good | Good |
| Example 1-3 | 1.0 | 1.0 | Good | Good |
| Example 1-4 | 3.0 | 3.0 | Good | Good |
| Comparative Example 1-1 | 0.0 | 0.0 | Poor | Poor |
| Comparative Example 1-2 | 12.0 | 12.0 | Poor | Good |
| Comparative Example 1-3 | 3.0 | 0.0 | Poor | Good |

[Evaluation]

The polymer electrolyte fuel cells provided with the membrane electrode assemblies of Examples 1-1 to 1-4 and the membrane electrode assemblies of Comparative Examples 1-1 to 1-3 were each evaluated with respect to the power generation performance and durability.

(Evaluation of Power Generation Performance)

For the measurement for evaluating the power generation performance, a method based on "Cell Evaluation Analysis Protocol" published by the New Energy and Industrial Technology Development Organization (NEDO) was used. A JARI standard cell in which a gas diffusion layer, a gasket, and a separator are arranged on both surfaces of the membrane electrode assembly and tightened to a predetermined surface pressure was used as the evaluation single cell. Then, an I-V measurement described in the "Cell Evaluation Analysis Protocol" was performed. The conditions at this time were set to standard conditions. Furthermore, an I-V measurement was performed with the relative humidity of the anode and the relative humidity of the cathode set to RH 100%. The conditions at this time were set to high humidity conditions.

Those cases where the current was 25 A or more when the voltage was 0.6 V under standard conditions, and the current was 30 A or more when the voltage was 0.6 V under high humidity conditions received a "Good" rating, and those cases that did not satisfy either of the above current values received a "Poor" rating.

(Evaluation of Durability)

The durability was evaluated using the same evaluation single cell as the evaluation single cell used in the measurements for evaluating the power generation performance, and by carrying out the humidity cycle test described in "Cell Evaluation Analysis Protocol".

Those cases where the hydrogen cross leak current after 8,000 cycles was less than 10 times the initial value received a "Good" rating, and those cases where it was 10 times or more received a "Poor" rating.

The results shown in Table 1 show the weight proportions of the fibrous material in the cathode side electrode catalyst layer of fuel cells provided with the membrane electrode assemblies of Examples 1-1 to 1-4 and the membrane electrode assemblies of Comparative Examples 1-1 to 1-3, the power generation performance evaluation, and the durability evaluation.

As shown in Table 1, the power generation performance and durability of Examples 1-1 to 1-4 all received a "Good" rating. It was confirmed that, when the content of the fibrous material having nitrogen atoms in the electrode catalyst layer was 1.0 wt % or more and less than 12 wt %, a fuel cell having the membrane electrode assembly using the electrode catalyst layer had excellent power generation performance and durability.

In Comparative Examples 1-1 to 1-3, at least one of the power generation performance and the durability received a "Poor" rating. It was confirmed that, when the content of the fibrous material having nitrogen atoms in the electrode catalyst layer was not in the range of 1.0 wt % or more and less than 12 wt %, at least one of the power generation performance and durability was reduced.

2. Second Embodiment

As a result of intensive studies on the initial power generation performance and the durable power generation performance of polymer electrolyte fuel cells, the inventors of the present invention have found that the performance is significantly affected by the gas diffusion properties and the proton conductivity in the electrode catalyst layer. Further, by using both an electron-conductive fibrous material and proton-conductive fibers in the electrode catalyst layer to form large voids, thereby improving the gas diffusion properties and lowering the proton-conductive resistance, the inventors have succeeded in obtaining a polymer electrolyte fuel cell that suppresses decrease in battery output and deterioration of the electrode catalyst layer, and that exhibits high power generation performance over the long term and that has excellent durability.

[Configuration of Electrode Catalyst Layer]

Hereinafter, a specific configuration of an electrode catalyst layer according to a second embodiment (referred to as "present embodiment" below) of the present invention will be described with reference to the drawings. The electrode catalyst layer according to the present embodiment differs from the electrode catalyst layer according to the first embodiment above in that at least one of electron-conductive fibers and proton-conductive fibers are included as the fibrous material. In the electrode catalyst layer 101, the same components as those of the electrode catalyst layer 10 according to the first embodiment are denoted by the same reference numerals, and description thereof will be omitted as appropriate.

Figure 3:
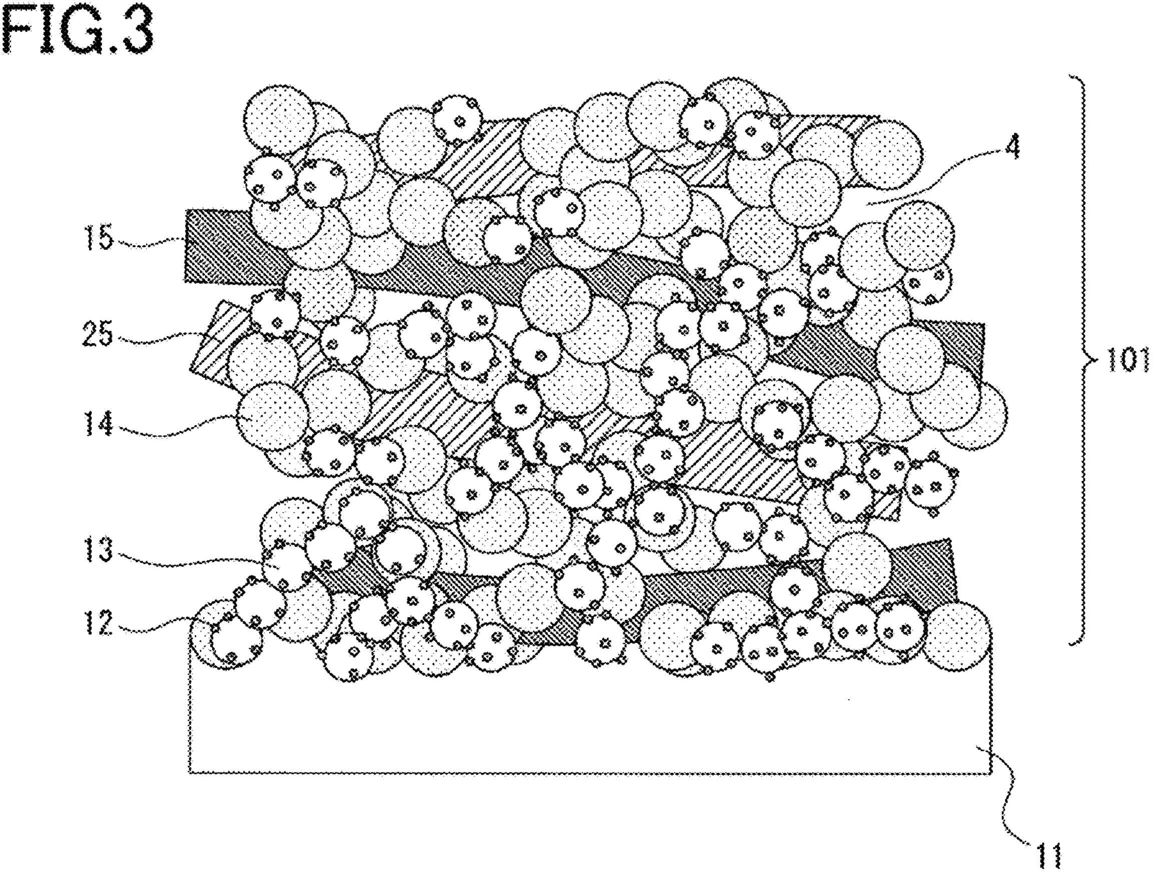
FIG. 3 is a cross-sectional view schematically showing an example of a cross-sectional structure of an electrode catalyst layer according to a second embodiment of the present invention.

As shown in the schematic diagram in FIG. 3, the electrode catalyst layer 101 according to the present embodiment is adhered to the surface of a polymer electrolyte membrane 11, and includes a catalyst material 12, a conductive carrier 13 that supports the catalyst material 12, a polymer electrolyte 14, a fibrous material 15 (first fibrous material), and a fibrous material 25 (second fibrous material). Further, voids 4 are formed in portions where none of the above components are present.

The fibrous material 25 contained in the electrode catalyst layer 101 according to the present embodiment is formed of one or more types of fibers including one or both of electron-conductive fibers and proton-conductive fibers. That is, in the electrode catalyst layer 101, the fibrous material 25 may be formed of one or more types of fibers including at least one of electron-conductive fibers and proton-conductive fibers.

In this way, in the electrode catalyst layer 101 according to the present embodiment, the fibrous material includes the fibrous material 15, which is the first fibrous material, and at least one of electron-conductive fibers and proton-conductive fibers.

Furthermore, the electrode catalyst layer 101 is configured such that the content of the fibrous material 25 in the electrode catalyst layer 101 is 1 wt % or more and 15 wt % or less. When the content of the fibrous material 25 is lower than the above range, the voids 4 become narrow, which can prevent sufficient drainage and gas diffusion properties from being ensured. In addition, cracks may occur in the electrode catalyst layer 101, resulting in reduction in the durability. When the content of the fibrous material 25 is higher than the above range, the proton conduction pathways through the polymer electrolyte 14 may become blocked, which can increase the resistance.

Moreover, the fibrous material 25 may preferably contain at least proton-conductive fibers, and the content of the proton-conductive fibers in the electrode catalyst layer 101 may more preferably be 1 wt % or more and 10 wt % or less. When the content of the proton-conductive fibers is lower than the above range, the proton conduction pathways through the proton-conductive fibers may become insufficient, which can increase the resistance. Furthermore, when the content of the proton-conductive fibers is greater than the above range, entanglement or aggregation of the fibers with each other blocks the voids, which can prevent sufficient drainage and gas diffusion properties from being ensured.

The weight ratio of the fibrous material 25 included in the electrode catalyst layer 101 can be obtained from a ratio of the weight after removal of contained materials other than the relevant material by a chemical procedure or an electrochemical procedure, and the weight before the removal procedure. For example, the catalyst material can be dissolved by an acid such as aqua regia that contains a strong oxidizing agent, and the conductive carrier can be burned out by applying a high potential. Furthermore, polymer electrolytes and polymer electrolyte membranes can be decomposed by hydrogen peroxide or the like.

Examples of the proton-conductive fibers include nanofibers (electrolyte nanofibers) obtained by processing a polymer electrolyte having proton conductivity into fibers. Since such proton-conductive fibers are flexible, the adverse effects described above may occur if the content is too high.

As the material for forming the proton-conductive fibers, fluorinated polyelectrolytes, hydrocarbon polyelectrolytes, and the like can be used. Examples of the fluorinated polyelectrolyte include Nafion (registered trademark) manufactured by DuPont, Flemion (registered trademark) manufactured by Asahi Glass Co., Ltd, Aciplex (registered trademark) manufactured by AGC Inc., and Aquivion (registered trademark) manufactured by Solvay. Examples of the hydrocarbon polyelectrolyte include electrolytes such as sulfonated polyether ketones, sulfonated polyether sulfones, sulfonated polyether ether sulfones, sulfonated polysulfides, sulfonated polyphenylenes, sulfonated polyimides, and acid-doped polybenzoazoles.

Examples of electron-conductive fibers include carbon fibers, carbon nanotubes, carbon nanohorns, and conductive polymer nanofibers. From the viewpoint of conductivity and dispersibility, in the present embodiment, it is preferable to use rigid carbon nanofibers as the electron-conductive fibers contained in the fibrous material 25.

The fibrous material 25 may be formed of only one type of the above fibers or two or more types of the above fibers. The fibrous material 25 may be formed of a combination of electron-conductive fibers and proton-conductive fibers. The fibrous material 25 preferably includes at least one type selected from a group consisting of carbon nanofibers, carbon nanotubes, and electrolyte nanofibers among the fibrous materials 25.

Furthermore, in the electrode catalyst layer 101 according to the present embodiment, the fibrous material 25 may contain a material having nitrogen atoms. That is, the fibrous material 25 may be formed of one or more types of fibers including either one or both of electron-conductive fibers containing a material having nitrogen atoms and proton-conductive fibers containing a material having nitrogen atoms. Moreover, when the fibrous material 25 includes both electron-conductive fibers and proton-conductive fibers, one of the electron-conductive fibers and the proton-conductive fibers may contain a material having nitrogen atoms.

The average fiber diameter of the fibrous material 25 included in the electrode catalyst layer 101 according to the present embodiment may preferably be 50 nm or more and 400 nm or less. As a result of setting the fiber diameter in this range, the voids 4 in the electrode catalyst layer 101 can be increased, and a decrease in the proton conductivity can be suppressed, which enables the output to be increased. When the average fiber diameter of the fibrous material 25 is smaller than the above range, the fibrous material blocks the voids, which can prevent sufficient drainage and gas diffusion properties from being ensured. Furthermore, when the average fiber diameter of the fibrous material 25 is larger than the above range, the conduction of electrons and protons by the conductive carrier 13 and the polymer electrolyte 14 may be inhibited, which can increase the resistance.

In addition, the fiber length of the fibrous material 25 may preferably be 1 μm or more to 50 μm or less, and more preferably be 5 μm or more to 20 μm or less. By setting the fiber length in a range of 1 μm or more and 50 μm or less, the strength of the electrode catalyst layer 101 can be increased, which in turn suppresses the occurrence of cracks in the electrode catalyst layer 101 when the electrode catalyst layer 101 is formed.

The fiber diameter of the fibrous material 25 is obtained by measuring, for example, the diameter of the fibrous material 25 that is exposed in the cross-section when a cross-section of the electrode catalyst layer 101 is observed using a scanning electron microscope (SEM). When the fibrous material 25 is cut diagonally, the shape of the exposed cross-section may be oval. In this case, the fiber diameter of the fibrous material 25 can be obtained by measuring the diameter of a perfect circle fitted along the minor axis. The average fiber diameter can be obtained by measuring the fiber diameter of the fibrous material 25 at a plurality of locations, such as 20 locations, and then calculating the arithmetic mean.

Because the method of exposing the cross-section of the electrode catalyst layer 101 is the same as the method of exposing the cross section of the electrode catalyst layer 10 in the first embodiment, description will be omitted.

In the same manner as the electrode catalyst layer 10 according to the first embodiment above, the thickness of the electrode catalyst layer 101 may preferably be 5 μm or more and 30 μm or less. If the thickness is more than 30 μm, cracks are likely to occur, and the diffusion properties and conductivity of the gas and water produced when used in fuel cells may decrease, resulting in a decrease in output. Furthermore, when the thickness is less than 5 μm, the layer thickness tends to vary, and the catalyst material 12 and the polymer electrolyte 14 inside tend to be non-uniform. Cracking on the surface of the electrode catalyst layer 101 and non-uniformity in the thickness can lead to a high probability of the durability being adversely affected when used as a fuel cell and operated over a long time, which is not preferable.

The thickness of the electrode catalyst layer 101 can be measured by, for example, observing the cross-section of the catalyst layer 101 using a scanning electron microscope (SEM). Because the method of exposing the cross-section of the electrode catalyst layer 101 is the same as the method of exposing the cross section of the electrode catalyst layer 10 in the first embodiment, description will be omitted.

Furthermore, because the catalyst material 12, the conductive carrier 13 and the polymer electrolyte 14 of the electrode catalyst layer 101 according to the present embodiment are the same as the catalyst material 12, the conductive carrier 13 and the polymer electrolyte 14 of the electrode catalyst layer 10 according to the first embodiment above, they are denoted by the same reference numerals, and description thereof will be omitted.

The polymer electrolyte contained in the polymer electrolyte membrane 11 and the polymer electrolyte 14 contained in the electrode catalyst layer 101 may be the same electrolyte, or different electrolytes to each other. However, in consideration of the interfacial resistance at the interface between the polymer electrolyte membrane 11 and the electrode catalyst layer 101, and the dimensional change ratio between the polymer electrolyte membrane 11 and the electrode catalyst layer 101 in the case of a change in humidity, it is preferable that the polymer electrolyte contained in the polymer electrolyte membrane 11, and the polymer electrolyte 14 contained in the electrode catalyst layer 101 are the same electrolyte, or are polymer electrolytes with similar thermal expansion coefficients.

[Configuration of Membrane Electrode Assembly]

Figure 4:
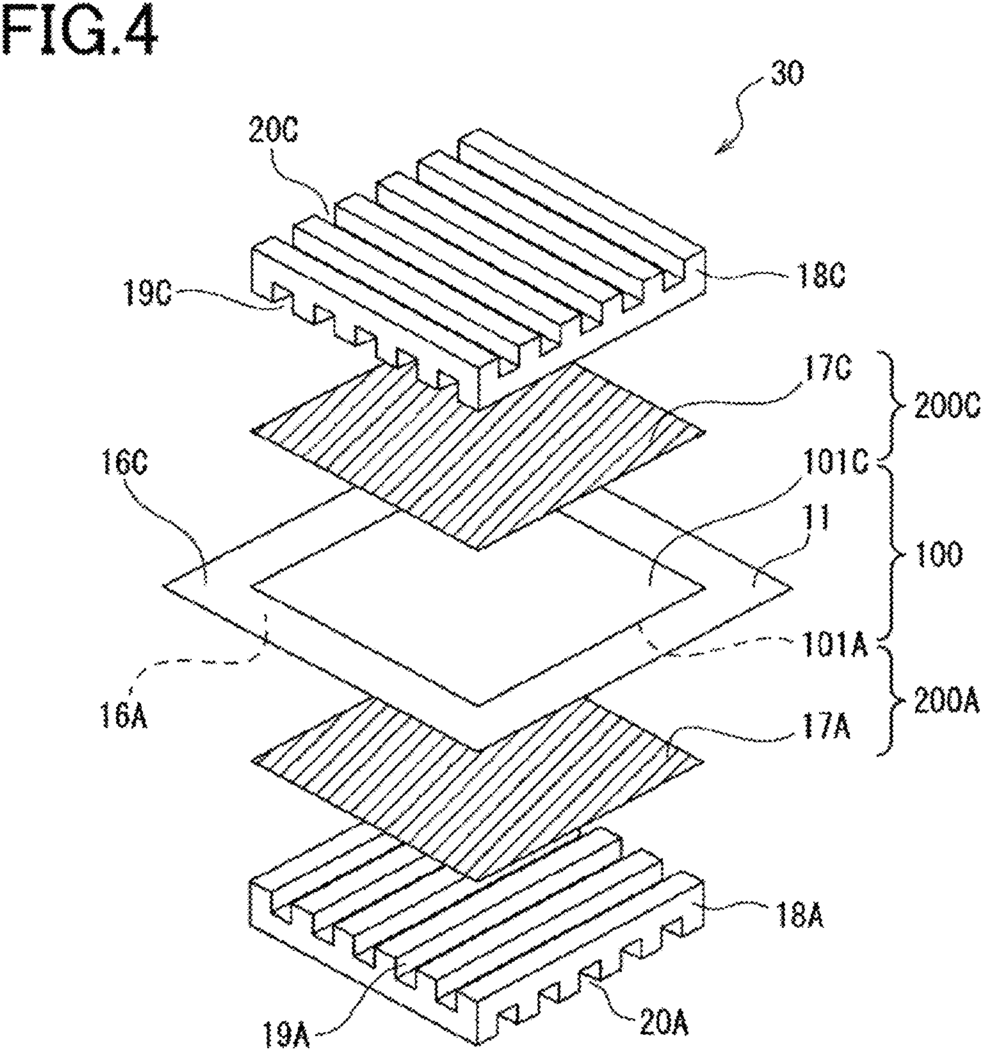
FIG. 4 is an exploded perspective view schematically showing the configuration of a polymer electrolyte fuel cell according to the second embodiment of the present invention.

Next, the configuration of the membrane electrode assembly will be described with reference to FIG. 4. FIG. 4 is an exploded perspective view showing an example of a configuration of a polymer electrolyte fuel cell 30 equipped with a membrane electrode assembly 100 provided with the electrode catalyst layer 101 according to the present embodiment.

The membrane electrode assembly 100 includes a polymer electrolyte membrane 11, and electrode catalyst layers 101C and 101A that are respectively adhered to the front and rear surfaces of the polymer electrolyte membrane 11. In the present embodiment, the electrode catalyst layer 101C formed on the upper surface (front surface) of the polymer electrolyte membrane 11 is a cathode side electrode catalyst layer constituting the oxygen electrode, and the electrode catalyst layer 101A formed on the lower surface (rear surface) of the polymer electrolyte membrane 11 is an anode side electrode catalyst layer constituting the fuel electrode. Hereinafter, the pair of electrode catalyst layers 101C and 101A will sometimes be abbreviated as "catalyst layers 101" when there is no need to distinguish between the two layers. In the membrane electrode assembly 100 according to the present embodiment, the electrode catalyst layers 101 are provided on at least one surface of the polymer electrolyte membrane 11. Furthermore, in a similar manner to the electrode catalyst layer 1 according to the first embodiment above, an oxygen electrode side gasket 16C and a fuel electrode side gasket 16A are arranged in the membrane electrode assembly 100 to prevent gas leakage from the peripheral sections where the electrode catalyst layers 101 of the polymer electrolyte membrane 11 are not adhered.

[Method of Producing Membrane Electrode Assembly]

A method of producing the membrane electrode assembly 100 above will be described below.

First, a catalyst ink is prepared. The method of producing the membrane electrode assembly 100 according to the present embodiment differs from the method of producing the membrane electrode assembly 1 according to the first embodiment above in that the catalyst material 12, the conductive carrier 13, the polymer electrolyte 14, the fibrous material 15, and the fibrous material 25 are mixed with the dispersion medium. Otherwise, the membrane electrode assembly 100 according to the present embodiment can be produced in the same manner as the method of producing the membrane electrode assembly 1 according to the first embodiment above.

Furthermore, when the electrode catalyst layer 101 is formed on the transfer substrate, the pressure and temperature applied to the electrode catalyst layer 101 during transfer of the electrode catalyst layer 101 affect the power generation performance of the membrane electrode assembly 100. To obtain a membrane electrode assembly having high power generation performance, in the same manner as the electrode catalyst layer 10 according to the first embodiment above, the pressure applied to the electrode catalyst layer 101 may preferably be 0.1 MPa or more and 20 MPa or less. When the pressure is 20 MPa or less, the electrode catalyst layer 101 is prevented from being excessively compressed. When the pressure is 0.1 MPa or more, the decrease in the power generation performance due to reduction in the bonding properties between the electrode catalyst layer 101 and the polymer electrolyte membrane 11 is suppressed. In consideration of improving the bonding properties of the interface between the polymer electrolyte membrane 11 and the electrode catalyst layer 101, and suppressing interfacial resistance, the temperature during bonding is preferably at around the glass transition temperature of the polymer electrolyte membrane 11 or the polymer electrolyte 14 contained in the electrode catalyst layer 101.

In the same manner as the first embodiment above, as the transfer substrate, for example, a polymer film or a sheet made of a fluororesin can be used. Fluororesins have excellent transferability. Examples of fluororesins include ethylene tetrafluoroethylene copolymer (ETFE), tetrafluoroethylene-hexafluoropropylene copolymer (FEP), tetrafluoroperfluoroalkyl vinyl ether copolymer (PFA), and polytetrafluoroethylene (PTFE). Examples of the polymer forming the polymer film include polyimide, polyethylene terephthalate, polyamide (Nylon (registered trademark)), polysulfone, polyethersulfone, polyphenylene sulfide, polyether ether ketone, polyether imide, polyarylate, and polyethylene naphthalate. A gas diffusion layer can also be used as the transfer substrate.

As mentioned above, the fibrous material 25 in the electrode catalyst layer 101 is formed of one or more types of fibers including at least one of electron-conductive fibers and proton-conductive fibers.

Electron-conductive fibers having catalytic activity are more preferable in terms of reducing the amount of noble metal catalyst used. When the electrode catalyst layer 101 is used as the electrode catalyst layer 101C constituting the oxygen electrode, the electron-conductive fibers having catalytic ability may be a carbon alloy catalyst prepared from carbon nanofibers.

The electron-conductive fibers having catalytic ability may be fibers obtained by processing an electrode active material into a fibrous form. The electrode active material may be a material containing at least one transition metal element selected from the group consisting of Ta, Nb, Ti, and Zr. Examples of the material containing a transition metal element contained in the electron-conductive fibers include partial oxides of transition metal carbonitrides, conductive oxides of transition metal elements, and conductive oxynitrides of transition metal elements. The electron-conductive fibers in the electrode catalyst layer 101 according to the present embodiment may contain at least one of these three materials as the material containing a transition metal element. That is, the electron-conductive fibers may be fibers containing one or more materials selected from these three materials.

Here, by adjusting the blending ratio of the fibrous material 25, the blending ratio of the polymer electrolyte 14, the solvent composition of the catalyst ink, the dispersion strength when adjusting the catalyst ink, and the heating temperature and heating rate of the coated catalyst ink, the electrode catalyst layer 101 can be provided with sufficient gas diffusion properties and proton conductivity.

For example, the blending ratio of the polymer electrolyte 14 in the electrode catalyst layer 101 is preferably from about the same to about half the weight of the conductive carrier 13. The blending ratio of the fibrous material 25 is preferably from about the same or less than the weight of the conductive carrier 13. The solid content ratio of the catalyst ink is preferably high to the extent that it can be applied to the thin film.

[Configuration of Polymer Electrolyte Fuel Cell]

Next, a specific configuration example of the polymer electrolyte fuel cell 30 provided with the membrane electrode assembly 100 according to the present embodiment will be described with reference to FIG. 4. Note that FIG. 4 is a configuration example of a single cell, and the polymer electrolyte fuel cell 30 is not limited to this configuration and may have a configuration in which a plurality of single cells are stacked.

As shown in FIG. 4, the polymer electrolyte fuel cell 30 includes the membrane electrode assembly 100, an oxygen electrode side gas diffusion layer 17C, and a fuel electrode side gas diffusion layer 17A. The gas diffusion layer 17C is arranged facing the electrode catalyst layer 101C, which is the cathode side electrode catalyst layer on the oxygen electrode side of the membrane electrode assembly 100. Furthermore, the gas diffusion layer 17A is arranged facing the electrode catalyst layer 101A, which is the anode side electrode catalyst layer on the fuel electrode side of the membrane electrode assembly 1. Moreover, the electrode catalyst layer 101C and the gas diffusion layer 17C constitute an oxygen electrode 200C, and the electrode catalyst layer 101A and the gas diffusion layer 17A constitute a fuel electrode 200A.

In addition, the polymer electrolyte fuel cell 30 includes a separator 18C, which is arranged facing the oxygen electrode 200C, and a separator 18A, which is arranged facing the fuel electrode 200A. The separator 18C includes gas flow channels 19C for passage of a reaction gas that are formed on the surface facing the gas diffusion layer 17C, and cooling water flow channels 20C for passing a coolant that are formed on the opposite surface to the surface in which the gas flow channels 19C are formed. Furthermore, the separator 18A has the same structure as the separator 18C, and includes gas flow channels 19A that are formed on the surface facing the gas diffusion layer 17A, and cooling water flow channels 20A that are formed on the opposite surface to the surface in which the gas flow channels 19A are formed. The separators 18C and 18A are made of a conductive and gas impermeable material.

Further, in the polymer electrolyte fuel cell 30, electrical power is generated by supplying an oxidizing agent such as air or oxygen to the oxygen electrode 200C through the gas flow channels 19C of the separator 18C, and supplying a fuel gas containing hydrogen or an organic fuel to the fuel electrode 200A through the gas flow channels 19A of the separator 18A.

By adopting the membrane electrode assembly 1 according to the present embodiment, the polymer electrolyte fuel cell 30 according to the present embodiment has sufficient drainage and gas diffusion properties, and is capable of exhibiting high power generation performance over the long term and have high durability.

That is, according to the present invention, it is possible to provide the electrode catalyst layer 101, the membrane electrode assembly 100, and the polymer electrolyte fuel cell 30 that have sufficient gas diffusion properties and proton conductivity during operation of the polymer electrolyte fuel cell 30, and are capable of exhibiting high power generation performance over the long term and have high durability. Therefore, the present invention is suitable for stationary cogeneration systems, fuel cell cars that utilize a polymer electrolyte fuel cell, and the like, and has a high industrial value.

Second Example

Hereinafter, examples of the membrane electrode assembly based on the present embodiment will be described.

Example 2-1

In Example 2-1, a carbon-supported platinum catalyst (TEC10E50E manufactured by Tanaka Kikinzoku Kogyo K.K.), water, 1-propanol, polymer electrolyte (20% Nafion (registered trademark) dispersed liquid manufactured by Wako Pure Chemical Industries, Ltd.), and carbon nanofibers (VGCF (registered trademark)-H, manufactured by Showa Denko Co., Ltd.) serving as a second fibrous material were mixed. The mixture was dispersed using a planetary ball mill at 300 rpm for 60 minutes. At this time, zirconia balls with a diameter of 5 mm were added to a level of about one third of the zirconia container. The catalytic ink was prepared by adjusting the weight of the polymer electrolyte to be 100 wt % with respect to the weight of the carbon support in the carbon-supported platinum catalyst, the carbon nanofibers to be 20 wt % with respect to the weight of the carbon support in the carbon-supported platinum catalyst, the proportion of water in the dispersion medium to be 50 wt %, and the solid content concentration to be 10 wt %.

A coating film was formed by applying the catalyst ink to one surface of a polymer electrolyte membrane (Nafion (registered trademark) 211, manufactured by Dupont) using a slit die coater so as to have a thickness of 200 μm. Next, the polymer electrolyte membrane with the coating film formed thereon was dried in a hot air oven at 80° C. until the tackiness of the coating film disappeared to form a cathode side electrode catalyst layer. Then, a coating film was formed by applying the catalyst ink to the other surface of the polymer electrolyte membrane using a slit die coater so as to have a thickness of 50 μm. Next, the polymer electrolyte membrane with the coating film formed thereon was dried in a hot air oven at 80° C. until the tackiness of the coating film disappeared to form an anode side electrode catalyst layer. As a result, the membrane electrode assembly of Example 2-1 was obtained. The proportion of the second fibrous material in the catalyst layer was 6 wt %.

Example 2-2

The membrane electrode assembly of Example 2-2 was obtained in the same manner as in Example 2-1, except that electrolyte nanofibers (sulfonated polyphenylene, diameter: 250 to 300 nm) were used as the second fibrous material instead of carbon nanofibers (VGCF (registered trademark)-H, manufactured by Showa Denko K.K.) when preparing the catalyst ink. The proportion of the second fibrous material in the catalyst layer was 6 wt %.

Example 2-3

The membrane electrode assembly of Example 2-3 was obtained in the same manner as in Example 2-1, except that the amount of carbon nanofibers serving as the second fibrous material was doubled (40 wt % with respect to the weight of the carbon support) relative to Example 2-1 when preparing the catalyst ink. The proportion of the second fibrous material in the catalyst layer was 12 wt %.

Example 2-4

In Example 2-4, a carbon-supported platinum catalyst (TEC10E50E manufactured by Tanaka Kikinzoku Kogyo K.K.), water, 1-propanol, polymer electrolyte (Nafion (registered trademark) dispersed liquid manufactured by Wako Pure Chemical Industries, Ltd.), carbon nanofibers (VGCF (registered trademark)-H, manufactured by Showa Denko K.K.), and electrolyte nanofibers (sulfonated polyphenylene, diameter: 250 to 300 nm) were mixed. That is, a configuration was used in which the second fibrous material contained carbon nanofibers and electrolyte nanofibers. The mixture was dispersed using a planetary ball mill at 300 rpm for 60 minutes. At this time, zirconia balls with a diameter of 5 mm were added to a level of about one third of the zirconia container. The weight of the polymer electrolyte was 100 wt % with respect to the weight of the carbon particles, and the weight of the carbon nanofibers and the electrolyte nanofibers (the weight of the second fibrous material) were each 10 wt % with respect to the weight of the carbon particles, or a total of 20 wt %. Furthermore, the proportion of water in the dispersion medium was adjusted to 50 wt %, and the solid content concentration was adjusted to 10 wt % to prepare a catalyst ink. The membrane electrode assembly of Example 2-4 was obtained in the same manner as in Example 2-1, except that this catalyst ink was used in forming the cathode side electrode catalyst layer. The proportion of the second fibrous material in the catalyst layer was 6 wt %.

Example 2-5

The membrane electrode assembly of Example 2-5 was obtained in the same manner as in Example 2-2, except that the amount of electrolyte nanofibers serving as the second fibrous material was halved (10 wt % with respect to the weight of the carbon support) relative to Example 2-1 when preparing the catalyst ink. The proportion of the second fibrous material in the catalyst layer was 3 wt %.

Example 2-6

The membrane electrode assembly of Example 2-6 was obtained in the same manner as in Example 2-4, except that the weight of the carbon nanofibers and the electrolyte nanofibers (weight of the second fibrous material) were each 2 wt % with respect to the weight of the carbon particles, or a total of 4 wt %, when preparing the catalyst ink. The proportion of the second fibrous material in the catalyst layer was 1 wt %.

Example 2-7

The catalyst ink was prepared using the same method as in Example 2-4. A coating film was formed by applying the catalyst ink to the surface of a PTFE film using a slit die coater so as to have a thickness of 200 μm. Next, the PTFE film with the coating film formed thereon was dried in a hot air oven at 80° C. until the tackiness of the coating film disappeared to obtain a cathode side electrode catalyst layer-attached transfer substrate. Then, a coating film was formed by applying the catalyst ink to the surface of another PTFE film using a slit die coater so as to have a thickness of 50 μm. Next, the PTFE film with the coating film formed thereon was dried in a hot air oven at 80° C. until the tackiness of the coating film disappeared to obtain an anode side electrode catalyst layer-attached transfer substrate.

A laminate was formed by arranging the cathode side electrode catalyst layer-attached transfer substrate and the anode side electrode catalyst layer-attached transfer substrate on the front and rear surfaces of the polymer electrolyte membrane (Nafion (registered trademark) 211, manufactured by Dupont) so as to face each other. Then, the laminate was hot-pressed at 120° C. and 1 MPa to adhere the electrode catalyst layers to the front and rear surfaces of the polymer electrolyte membrane. Finally, the membrane electrode assembly of Example 2-7 was obtained by removing the PTFE film from each of the electrode catalyst layers. The proportion of the second fibrous material in the catalyst layer was 6 wt %.

Comparative Example 2-1

The membrane electrode assembly of Comparative Example 2-1 was obtained in the same manner as in Example 2-1, except that carbon nanofibers serving as the second fibrous material were not added when preparing the catalyst ink. The proportion of the second fibrous material in the catalyst layer was 0 wt %.

Comparative Example 2-2

The membrane electrode assembly of Comparative Example 2-2 was obtained in the same manner as in Example 2-1, except that the amount of carbon nanofibers serving as the second fibrous material was tripled (60 wt % with respect to the weight of the carbon particles) relative to Example 2-1 when preparing the catalyst ink. The proportion of the second fibrous material in the catalyst layer was 17 wt %.

Comparative Example 2-3

The membrane electrode assembly of Comparative Example 2-3 was obtained in the same manner as in Example 2-4, except that the weight of the carbon nanofibers and the electrolyte nanofibers (weight of the second fibrous material) were each 40 wt % with respect to the weight of the carbon particles, or a total of 80 wt %, when preparing the catalyst ink. The proportion of the second fibrous material in the catalyst layer was 21 wt %.

[Evaluation]

The polymer electrolyte fuel cells provided with the membrane electrode assemblies of Examples 2-1 to 2-7 and the membrane electrode assemblies of Comparative Examples 2-1 to 2-3 were each evaluated with respect to the power generation performance and durability.

(Evaluation of Power Generation Performance)

For the measurement for evaluating the power generation performance, a method based on "Cell Evaluation Analysis Protocol" published by the New Energy and Industrial Technology Development Organization (NEDO) was used. Specifically, a JARI standard cell in which a gas diffusion layer, a gasket, and a separator are arranged on both surfaces of the membrane electrode assembly and tightened to a predetermined surface pressure was used as the evaluation single cell. Then, an I-V measurement described in the "Cell Evaluation Analysis Protocol" was performed. The conditions at this time were set to standard conditions.

Furthermore, an I-V measurement was performed with the relative humidity of the anode and the relative humidity of the cathode set to RH 100%. The conditions at this time were set to high humidity conditions.

In the power generation performance evaluation, those cases where the current was 25 A or more when the voltage was 0.6 V under standard conditions, and the current was 30 A or more when the voltage was 0.6 V under high humidity conditions received a "Good" rating, and those cases that did not satisfy either of the above current values above received a "Poor" rating.

(Evaluation of Durability)

In the durability evaluation, the same evaluation single cell as the evaluation single cell used in the measurements for evaluating the power generation performance was used. Further, the durability was evaluated by carrying out the humidity cycle test described in "Cell Evaluation Analysis Protocol".

In the durability evaluation, those cases where the hydrogen cross leak current after 8,000 cycles was less than 10 times the initial value received a "Good" rating, and those cases where it was 10 times or more received a "Poor" rating.

[Evaluation Results]

Table 2 shows the weight proportions of the fibrous material in the cathode side electrode catalyst layer of fuel cells provided with the membrane electrode assemblies of Examples 2-1 to 2-7 and the membrane electrode assemblies of Comparative Examples 1 to 3, the evaluation results of the power generation performance, and the evaluation results of the durability evaluation.

In Table 2, the "fibrous material content" indicates the "content of the second fibrous material in the catalyst layer".

TABLE 2

| | Fibrous Material Content [wt %] | Power Generation Performance | Durability |
|---|---|---|---|
| Example 2-1 | 6 | Good | Good |
| Example 2-2 | 6 | Good | Good |
| Example 2-3 | 12 | Good | Good |
| Example 2-4 | 6 | Good | Good |
| Example 2-5 | 3 | Good | Good |
| Example 2-6 | 1 | Good | Good |
| Example 2-7 | 6 | Good | Good |
| Comparative Example 2-1 | 0 | Poor | Poor |
| Comparative Example 2-2 | 17 | Poor | Good |
| Comparative Example 2-3 | 21 | Poor | Good |

As shown in Table 2, in each of Examples 2-1 to 2-7, the content of the second fibrous material in the electrode catalyst layer was 1 wt % or more and 15 wt % or less. Further, the power generation performance and the durability both received a "Good" rating. That is, in Examples 2-1 to 2-7, membrane electrode assemblies were obtained that are capable of forming a fuel cell having excellent power generation performance and durability.

On the other hand, in the Comparative Examples, in each of Comparative Examples 2-1 to 2-3, the content of the second fibrous material in the electrode catalyst layer was outside the range of 1 wt % or more and 15 wt % or less. Further, at least one of the power generation performance and the durability received a "Poor" rating. That is, when the content of the second fibrous material in the electrode catalyst layer was outside the above range, at least one of the power generation performance and the durability decreased.

The content of the proton-conductive fibers containing electrolyte was 6 wt % in Example 2-2, 3 wt % in Example 2-4, Example 2-5, and Example 2-7, and 1 wt % in Example 2-6, each of which had good power generation performance and durability. On the other hand, in Comparative Example 2-3, which did not have good power generation performance, the content of the proton-conductive fibers was 11%. Therefore, it was found that when the content of the proton-conductive fibers was 1 wt % or more and 10 wt % or less, a membrane electrode assembly capable of forming a fuel cell with even better power generation performance can be obtained.

REFERENCE SIGNS LIST

1, 100 . . . Membrane electrode assembly; 2C, 200C . . . Oxygen electrode; 2A, 200A . . . Fuel electrode; 3, 30 . . . Polymer electrolyte fuel cell; 4 . . . Void; 10, 10C, 10A, 101, 101C, 101A . . . Electrode catalyst layer; 11 . . . Polymer electrolyte membrane; 12 . . . Catalyst material; 13 . . . Conductive carrier; 14 . . . Polymer electrolyte; 15, 25 . . . Fibrous material; 16C, 16A . . . Gasket; 17C, 17A . . . Gas diffusion layer; 18C, 18A . . . Separator; 19C, 19A . . . Gas flow channel; 20C, 20A . . . Cooling water flow channel.

What is claimed is:

1. An electrode catalyst layer for use in a polymer electrolyte fuel cell, comprising:

a catalyst material;

a conductive carrier that supports the catalyst material;

a polymer electrolyte; and a fibrous material having a nitrogen atom, wherein the fibrous material having a nitrogen atom is the only fibrous material in the catalyst layer, and, a content of the fibrous material in the electrode catalyst layer is 1 wt % or more and 6 wt % or less.

2. The electrode catalyst layer of claim 1, wherein an average fiber diameter of the fibrous material is 50 nm or more and 400 nm or less.

3. The electrode catalyst layer of claim 1, wherein an average fiber length of the fibrous material is 1 μm or more and 100 μm or less.

4. The electrode catalyst layer of claim 1, wherein the fibrous material contains a Lewis base having an unshared electron pair.

5. A membrane electrode assembly comprising the electrode catalyst layer of claim 1 provided on at least one surface of a polymer electrolyte membrane.

6. A polymer electrolyte fuel cell comprising the membrane electrode assembly of claim 5.

7. The electrode catalyst layer of claim 1, wherein the content of the fibrous material in the electrode catalyst layer is 1 wt % or more and 3 wt % or less.

* * * * *